United States Patent

Boekhorst

[15] 3,678,332

[45] July 18, 1972

[54] CIRCUIT ARRANGEMENT FOR ADJUSTING THE LINEARITY OF THE DEFLECTION SIGNAL GENERATED FOR A DEFLECTION SYSTEM

[72] Inventor: Antonius Boekhorst, Emmasingel, Eindhoven, Netherlands

[73] Assignee: U.S. Philips Corporation, New York, N.Y.

[22] Filed: March 10, 1970

[21] Appl. No.: 18,135

[30] Foreign Application Priority Data

March 20, 1969 Netherlands..........................6904267

[52] U.S. Cl. ........................315/27 R, 307/228, 315/27 TD, 328/181, 328/185

[51] Int. Cl. ........................................................H01j 29/70

[58] Field of Search ............315/27 TD, 27 LC, 27; 328/184, 328/181, 185; 307/228

[56] References Cited

UNITED STATES PATENTS 3,111,602 11/1963 Hellstrom..........................315/27 TD 3,185,889 5/1965 Attwood...........................315/27 TD

FOREIGN PATENTS OR APPLICATIONS 914,254 1/1963 Great Britain.........................328/184

*Primary Examiner*—Malcolm F. Hubler
*Assistant Examiner*—R. Kinberg
*Attorney*—Frank R. Trifari

[57] ABSTRACT

A circuit arrangement for adjusting the linearity of the deflection signal generated for a deflection system, particularly for a field deflection signal in a television receiver. Two RC-networks which are connected through a third RC-network during the sweep are arranged after the field oscillator between supply voltage and earth. The variation of the resistor in this third RC-network renders it possible to vary the curvature of the voltage waveform at the output. During the flyback the two charge capacitors are discharged by means of a diode which is connected parallel to the third network. The frequency amplitude and linearity adjusting members are separated from one another.

5 Claims, 4 Drawing Figures

Figures 1, 2, 3, 4:
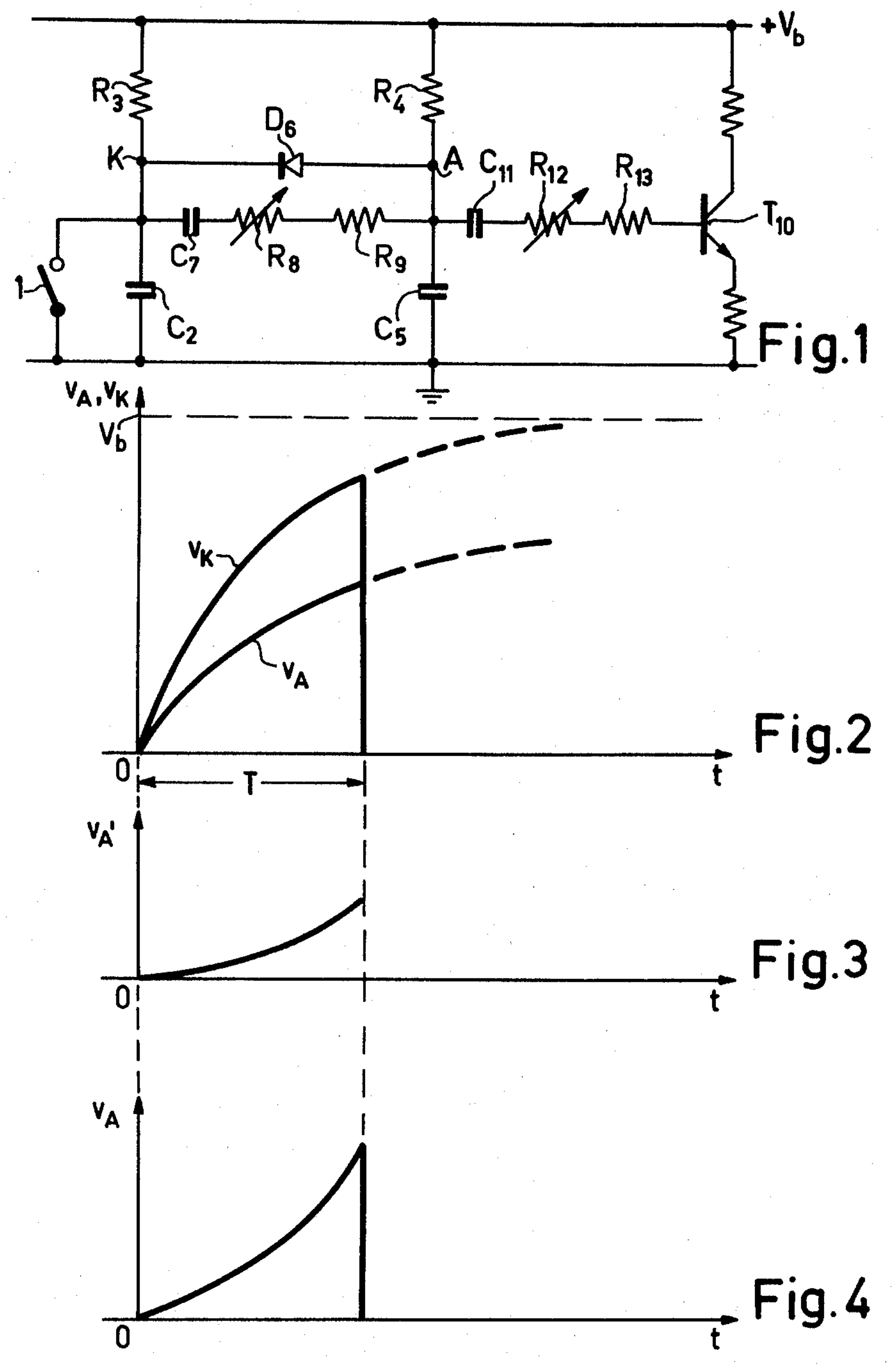

INVENTOR.

BY ANTONIUS BOEKHORST

AGENT

CIRCUIT ARRANGEMENT FOR ADJUSTING THE LINEARITY OF THE DEFLECTION SIGNAL GENERATED FOR A DEFLECTION SYSTEM

The invention relates to a circuit arrangement for adjusting the linearity of the deflection signal generated for a deflection system and having a sweep and a flyback period, wherein two networks each comprising the series arrangement of a resistor and a capacitor are arranged between the two terminals of a voltage supply source and which are separated from each other by a diode which is blocked during the sweep period, and comprising means for causing said diode to conduct during the flyback period, the capacitors of said networks being discharged through this diode and said means.

Such an arrangement is known form U.S. Pat. No. 3,185,889. This specification describes a circuit arrangement which forms part of a deflection system of a cathode-ray tube, particularly for the time base of field frequency of a television receiver. This circuit arrangement employs two RC-networks which are separated from each other by a diode and which are arranged between the supply voltage and ground. The field oscillator is arranged in parallel with the capacitor in the first of these two RC-networks, while the output transistor is driven by the voltage generated across the capacitor in the second RC-network. The time constant of the first RC-network is short relative to a field period and its resistance is variable in order to adjust the oscillator frequency. On the other hand the time constant of the second RC-network is rather long relative to one field period so that the control voltage of the final transistor is a small portion of an e-power shaped voltage. Furthermore, the circuit arrangement according to the said U.S. patent employs two negative feedback networks for the purpose of improving the linearity of this control voltage. It is to be noted that the resistor in the second RC-network is variable so that the amplitude of the control voltage for the final transistor is optionally adjustable: hence this resistor is the amplitude (picture height) control.

During the sweep the two RC-networks are separated from each other by means of the diode so that the frequency adjustment is independent of the amplitude adjustment. During the fly-back, the oscillator forms a short circuit to ground across the capacitor in the first RC-network. The polarity of the diode is chosen to be such that this diode then conducts so that the capacitor in the second RC-network is also discharged.

However, the above-described circuit arrangement has the drawback that the amplitude control exerts influence on the shape of the control voltage of the final transistor. In fact, if the amplitude is adjusted differently, the time constant of the second RC-network varies and hence also the curvature of the generated e-power shaped voltage. This results in the amplitude adjustment being not independent of the two linearity adjusting members which can be found in the circuit arrangement. For every new adjustment of the amplitude, the linearity must be readjusted every time. An object of the present invention is to eliminate this drawback and to this end it is characterized in that a network comprising the series arrangement of a capacitor, a fixed resistor and a variable resistor is arranged parallel to said diode, so that due to the adjustment of said resistor the output voltage of the circuit arrangement is a voltage increasing with time, whose differential coefficient with respect to time may either increase or decrease, or remain constant.

It is to be noted that it is possible to adjust the frequency of the oscillator in a manner different from that in the mentioned U.S. patent so that the resistor in the first RC-network may be non-variable. The waveform which is produced across the capacitor in the first RC-network thus has a fixed shape. The invention is furthermore based on the recognition of the fact that this waveform is used to improve the linearity so that the adjustable negative feedback circuits in the mentioned U.S. patent may be omitted, which is a considerable simplification.

As will further be described, the circuit arrangement according to the present invention provides the possibility of making purely linear the voltage generated by the circuit arrangement and intended as a control voltage for a driver or final transistor succeeding the circuit arrangement. However, this is not always desirable. The field distribution which is generated by the field deflection coils within the picture tube is not homogeneous and it may happen that the axis of the deflection coil unit does not exactly coincide with the axis of the electron gun. Consequently, it is still possible for a non-linear vertical deflection to be produced at an exactly linear field deflection current. This may be particularly the case in picture tubes having greater deflection angles which are currently used. It is evident from the foregoing that it must be possible for the output voltage of the circuit arrangement according to the invention to be linear, but it must also be possible to adjust it optionally for generating a voltage wave-form having a gentle curvature, the slope of this waveform either increasing or decreasing which may alternatively be expressed by stating that the differential coefficient with respect to time of the voltage either increases or decreases.

In order that the invention may be readily carried into effect, an embodiment thereof will now be described in detail, by way of example, with reference to the accompanying diagrammatic drawing, in which FIG. 1 shows an embodiment of a circuit arrangement according to the invention.

FIGS. 2, 3, 4 show a few waveforms on various points in the circuit arrangement of FIG. 1 under different circumstances.

In FIG. 1 switch 1 represents a field oscillator which may be formed in known manner and which can be synchronized in a manner not shown in the drawing by field synchronizing pulses derived from a received television signal. A capacitor $C_2$ is connected to the terminals of oscillator 1, and a resistor $R_3$ is arranged between the junction K of oscillator 1 and capacitor $C_2$ and the supply voltage $V_b$. A second RC-series network comprising a resistor $R_4$ and a capacitor $C_5$ is arranged between supply voltage $V_b$ and ground. A diode $D_6$ and a series network comprising a capacitor $C_7$, a variable resistor $R_8$ and a resistor $R_9$ are arranged between point K and the junction A of resistor $R_4$ and capacitor $C_5$. The voltage present on point A drives transistor $T_{10}$ through a capacitor $C_{11}$, a variable resistor $R_{12}$ and a resistor $R_{13}$. Transistor $T_{10}$ may be an amplifier or a driver in known manner or it may form part of an output stage. Transistor $T_{10}$ may be, for example, the first transistor in the circuit arrangement according to U.S. Pat. No. 3,434,004. In the embodiment described in FIG. 1, the supply voltage $V_b$ is chosen to be positive relative to ground, the cathode of diode $D_6$ being connected to point K and its anode being connected to point A.

The time constant $R_3C_2$ of the first RC-network is in the order of two field periods whereas the time constant $R_4C_5$ of the second RC-network is approximately three times larger than $R_3C_2$. As a result capacitor $C_5$ is charged at a slower rate than capacitor $C_2$ and the potential on the point A is therefore always lower during the charging process than the potential on the point K and diode $D_6$ remains blocked as long as switch 1 remains open (= the sweep of the field period). When switch 1 closes (=flyback) point K is substantially connected to ground so that diode $D_6$ starts to conduct. Point A is therefore also substantially connected to ground and the two capacitors $C_2$ and $C_5$ are discharged quickly.

During the sweep the points K and A are connected together by means of the network $C_7$, $R_8$, $R_9$. An alternating current which is derived from the voltage present on point K flows through this network and also through capacitor $C_5$. As a result the voltage on point A acquires the desired form as will be explained hereinafter.

Since the network $C_7$, $R_8$ $R_9$ and the blocked Diode $D_6$ and the circuit arrangement shown in FIG. 1 on the right-hand side of point A have a larger impedance for the field frequency than the reactances of capacitors $C_2$ and $C_5$ (whose capacitances are in the order of one or more $\mu$F) the voltages on point K and A are in the first instance e-power shaped and the amplitude of the output voltage on point A is determined substantially exclusively by the time constant $R_4C_5$. As long as the sum of the resistances of the resistors $R_8$ and $R_9$ is large, the current between points K and A remains small and the output voltage on point A is e-power shaped having a decreasing slope as is shown in FIG. 2 by curve $v_A$ wherein T is the duration of the sweep period.

If the resistance of resistor $R_8$ is reduced, the current which flows through the network $C_7$, $R_8$, $R_9$ is no longer negligible. If the value of capacitor $C_7$ is chosen to be fairly large, this current is almost only determined by resistors $R_8$ and $R_9$ and capacitor $C_5$. A voltage $v_A$ is then produced across capacitor $C_5$ which voltage is substantially the result of the integration of voltage difference between $V_A$ and K $v_K$ in FIG. 2, the latter showing the voltage variation across capacitor $C_2$ during the sweep period T and which is added to the voltage $v_A$ in FIG. 2. If, as a first approximation, the voltage $v_K$ is considered to be sawtooth-shaped, the voltage $v_A'$ thus integrated is substantially parabola-shaped as is shown in FIG. 3. It will be evident that for a given value of resistor $R_8$ the differential coefficient with respect to time of the voltage $v_A'$ of FIG. 3 will be substantially equal, but opposite to the differential coefficient of voltage $v_A$ of FIG. 2. The sum of the voltages $v_A'$ and $v_A$ being the voltage active on the point A will then be substantially linear, that is to say, substantially purely sawtooth-shaped.

As the resistance of resistor $R_8$ is reduced, the amplitude of the added parabola voltage is increased so that the slope of the resultant voltage waveform on point A does not decrease, but increases and this voltage may be plotted as a function of time as in FIG. 4.

As has been stated the waveform obtained depends on the resistance of resistor $R_8$; thus this resistor serves for the linearity control. It should be noted that the sum of the resistors $R_8$ and $R_9$ must not become zero since the voltage $v_A'$ to be added would then vary in accordance with an e-power function because capacitors $C_5$ and $C_7$ would constitute a capacitive potential divider. The resultant output voltage would then always have a decreasing differential coefficient with respect to time. Consequently, a very simple linearity adjustment has become possible with the circuit arrangement according to the invention because a control voltage can be generated which may have a substantially purely linear slope or an increasing or decreasing slope dependent on whether this is required by the field deflection coils and the assembly of the electron gun in the neck of the display tube.

The output voltage on point A is applied to transistor $T_{10}$ through the network $C_{11}$, $R_{12}$, $R_{13}$, wherein resistor $R_{12}$ is adjustable. The base current flowing through transistor $T_{10}$ is determined thereby, so that resistor $R_{12}$ can be considered to serve for the amplitude (picture height) control. If for the field frequency the impedance of the combination of network $C_{11}$, $R_{12}$, $R_{13}$ and of the input impedance of transistor $T_{10}$ is sufficiently large relative to the reactance of capacitor $C_5$, the circuit arrangement shown in FIG. 1 on the right-hand side of point A does not exert substantially any influence on the voltage present on point A. As a result the object of rendering the amplitude and linearity adjustments independent of each other is achieved. These two adjustments also cannot exert influence on the frequency adjustment of oscillator 1, since diode $D_6$ and capacitor $C_7$ maintain the points A and K separated from each other during the sweep.

Since $v_K$ in FIG. 2 is actually not sawtooth-shaped and since capacitor $C_7$ is not infinitely great relative to capacitor $C_5$, voltage $v_A'$ of FIG. 3 is actually not exactly parabola-shaped but has terms of higher order. The previous considerations nevertheless largely apply since the resistances of resistors $R_8$ and $R_9$ are rather large so that the added correction voltage $v_A'$ remains small. An observation with the aid of an oscilloscope of oscillograms on the point A ascertains that the neglected terms of a higher order only constitute a fraction of the output voltage.

It is to be noted that the final field stage must receive a control voltage which is substantially exclusively determined by the shape of the desired deflection current, that is to say, by the nature of the load on this final stage. In fact, a strong current negative feedback may be used in the final stage. If this is a tube, for example, the negative feedback is effected by means of a cathode-resistor through which the deflection current flows so that the cathode voltage is determined by this deflection current rather than by the smaller input voltage which is applied between the control grid and the cathode. If the field deflection coil is coupled to the final stage by means of a transformer, then, as is known, the control voltage of the final stage must be the combination of a sawtooth voltage and a parabola voltage. If this coupling is not established by means of a transformer, this parabola voltage need not be present. Further more, a so-called S-correction must take place due to the almost flat shape of the screen of the picture display tube. All these corrections may be performed in the final-stage itself, while the circuit arrangement according to the invention does not envisage this.

So far the circuit arrangement according to the invention has been described as a component of a television device, namely for the field deflection portion. It is evident that the relevant circuit arrangement is alternatively suitable for other uses wherein a waveform must be generated which must have a shape which may vary between curve $v_A$ in FIG. 2 and the curve in FIG. 4. Such a use is, for example, the horizontal deflection generator of an oscilloscope wherein a deflection voltage instead of a deflection current must be generated.

According to the above-described embodiment the output signal of the circuit arrangement was a slightly "curved" increasing sawtooth. It is of course alternatively possible to produce a waveform increasing in a negative direction in the same manner provided that the supply voltage is then rendered negative relative to ground and provided that the connections of diode $D_6$ are interchanged.

A number of practical values for use in a field deflection generator of a television receiver are given below by way of example:

capacitor $C_2 = 2.2\ \mu F$,
resistor $R_3 = 22$ kohm.
resistor $R_4 = 150$ kohm.
capacitor $C_5 = 1\ \mu F$,
diode $D_6$ = Philips type BA 148,
capacitor $C_7 = 4\ \mu F$,
resistor $R_8 = 47$ kohm,
resistor $R_9 = 18$ kohm,
supply voltage $V_b = 25$ V.

What is claimed is:

1. A circuit arrangement for adjusting the linearity of the deflection signal generated for a deflection system and having a sweep and a flyback period, wherein two networks each comprising the series arrangement of a resistor and a capacitor are arranged between the two terminals of a voltage supply source and which are separated from each other by a diode which is blocked during the sweep period, and comprising means for causing said diode to conduct during the flyback period, the capacitors of said networks being discharged through said diode and said means, characterized in that a network comprising the series arrangement of a capacitor, a fixed resistor and a variable resistor is arranged parallel to said diode, so that due to the adjustment of said resistor the output voltage of the circuit arrangement is a voltage increasing with time, whose differential coefficient with respect to time may either increase or decrease, or remain constant.

2. A circuit for operating from a power supply comprising a first resistor-capacitor circuit coupled to said supply and having a first time constant; a second resistor-capacitor circuit coupled to said supply and having a second time constant greater than said first time constant, whereby said second circuit capacitor charges slower than said first circuit capacitor, a third resistor-capacitor circuit coupled between said capacitors and having an adjustable time constant substantially larger than said first and second circuits time constants whereby a current flows through said third circuit to additionally charge said second circuit capacitor and said third circuit resistor can be adjusted to result in linear charging of said second circuit capacitor; and means for periodically discharging all of said circuits.

3. A circuit as claimed in claim 2 wherein said discharging means comprises a diode having an anode coupled to said second circuit and a cathode coupled to said first circuit; and a switch coupled to said first circuit.

4. A circuit as claimed in claim 3 wherein said switch comprises a vertical oscillator.

5. A circuit as claimed in claim 2 further comprising means for amplifying coupled to said second circuit capacitor.

* * * * *